March 9, 1954
W. J. LOFLAND
2,671,517
HELICOPTER ROTOR-CONTROL STRUCTURE
Filed April 30, 1947
5 Sheets-Sheet 1
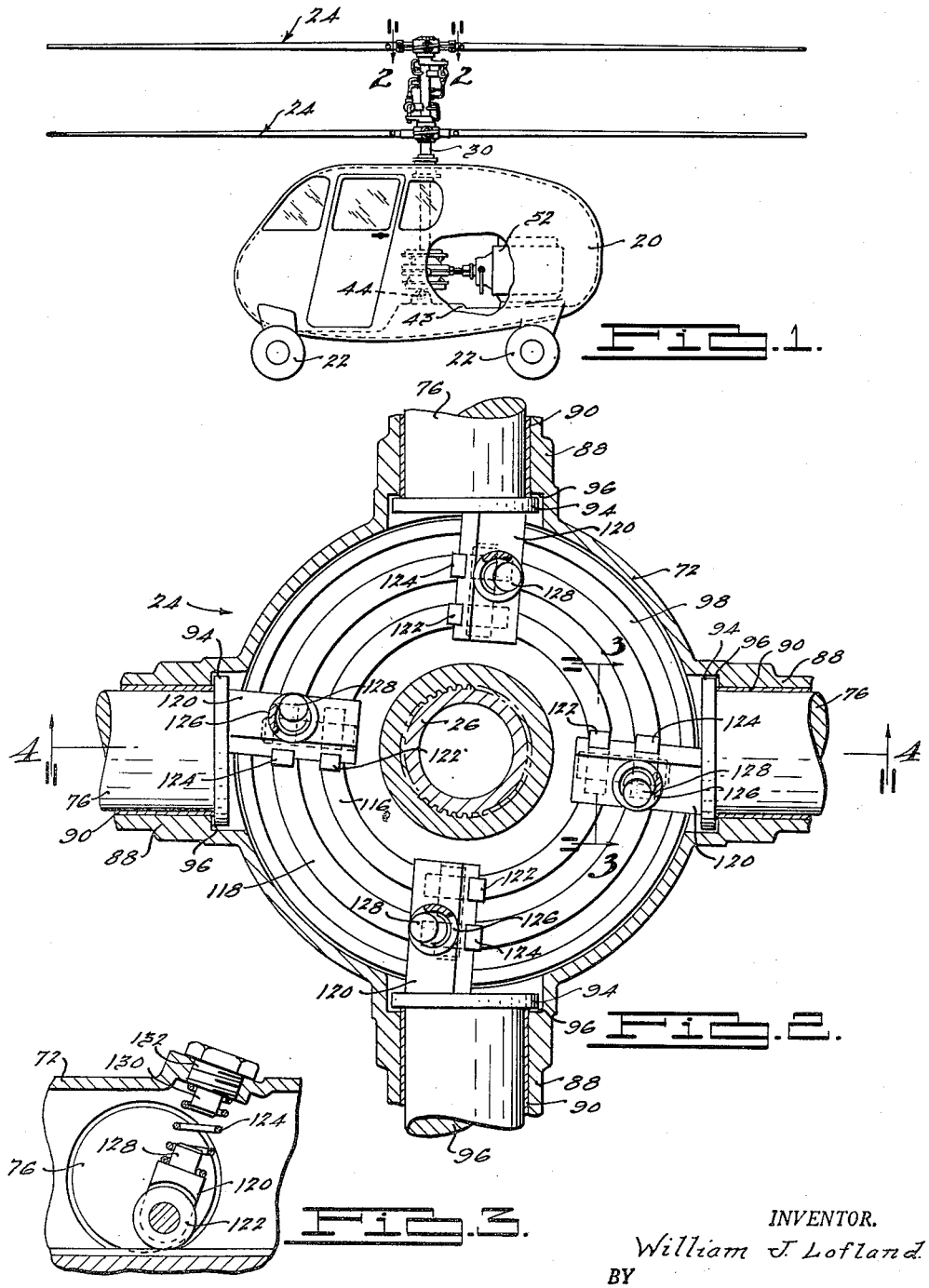
INVENTOR.
William J. Lofland
BY
Harness, Dickey & Pierce
ATTORNEYS.

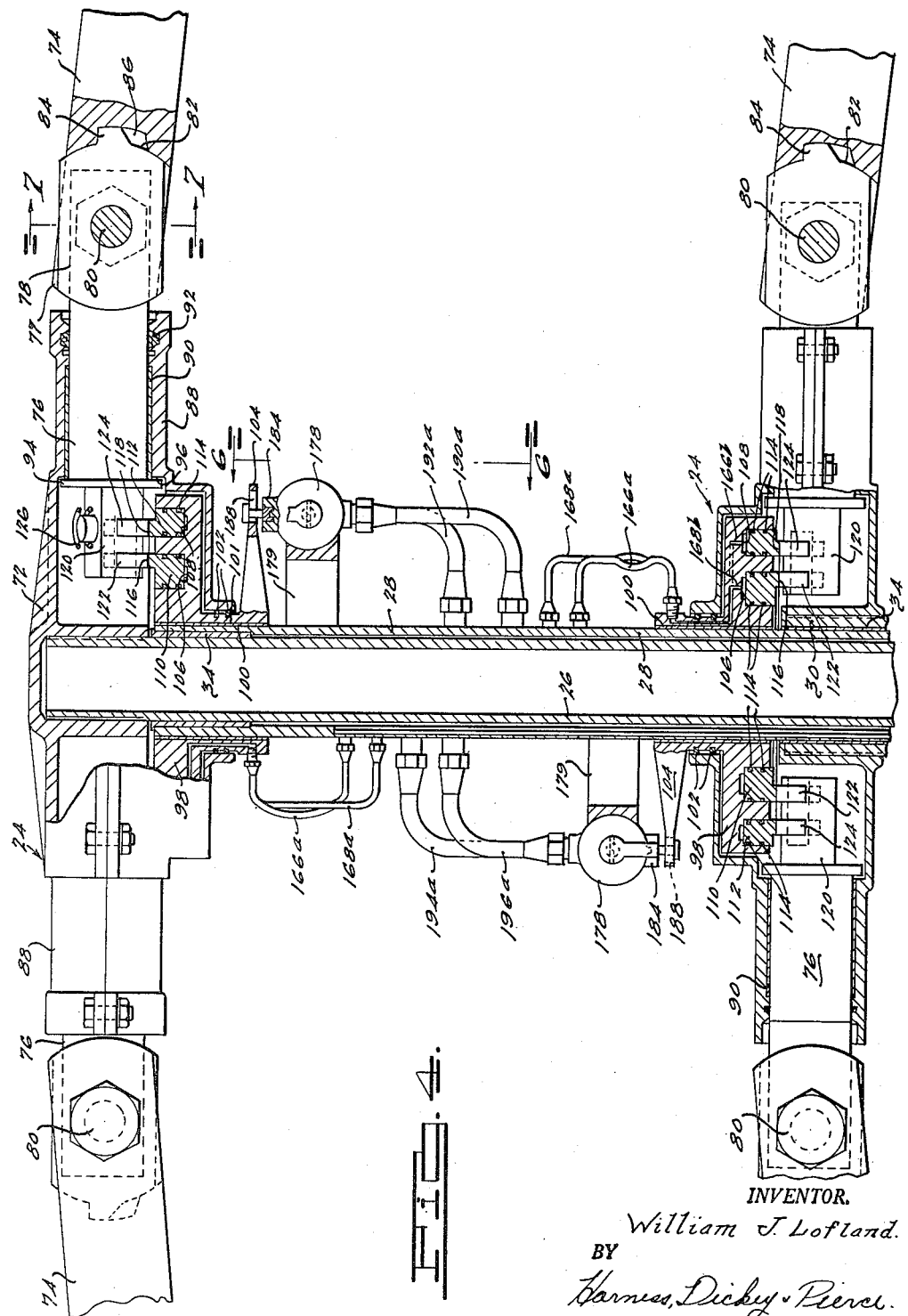

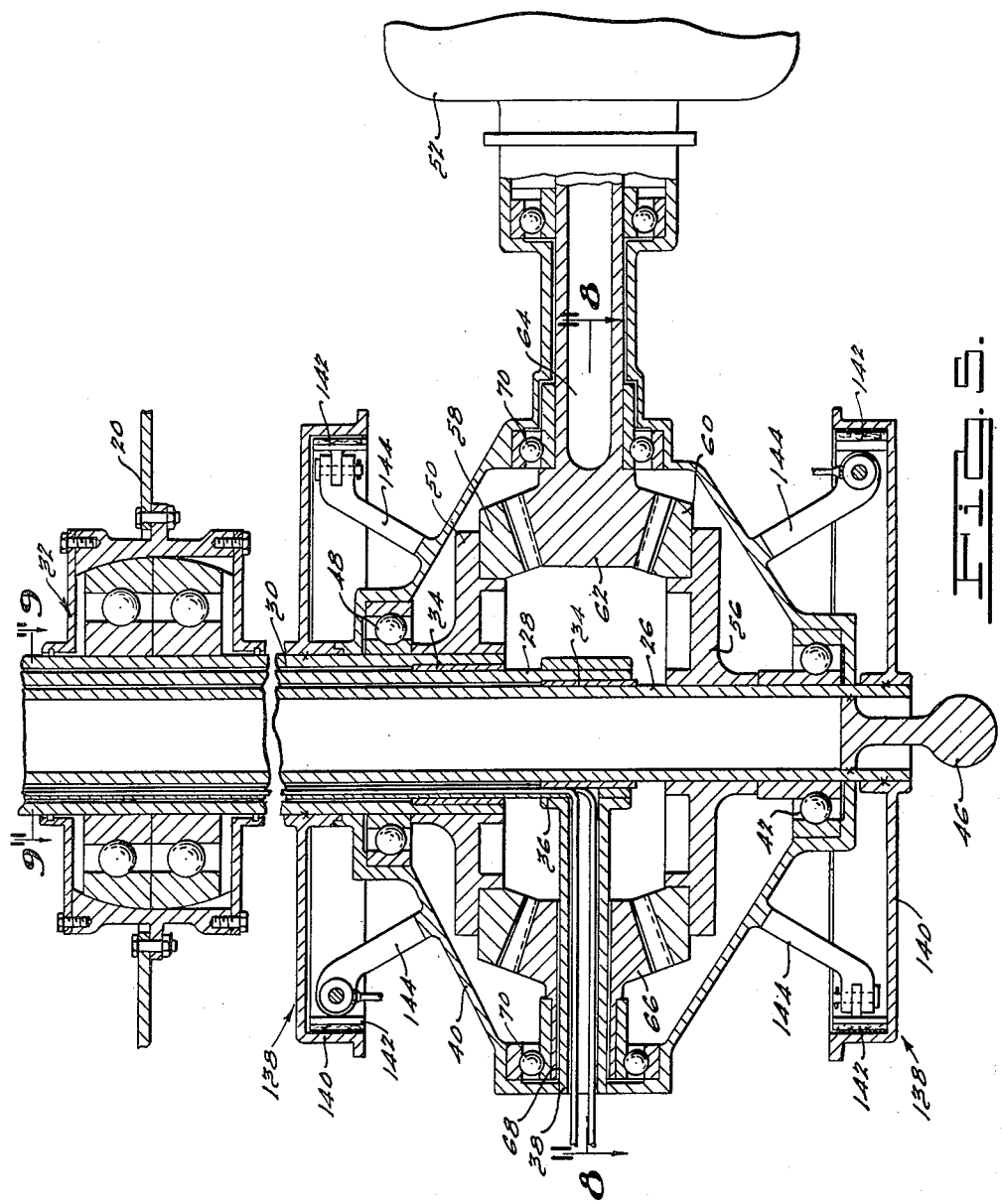

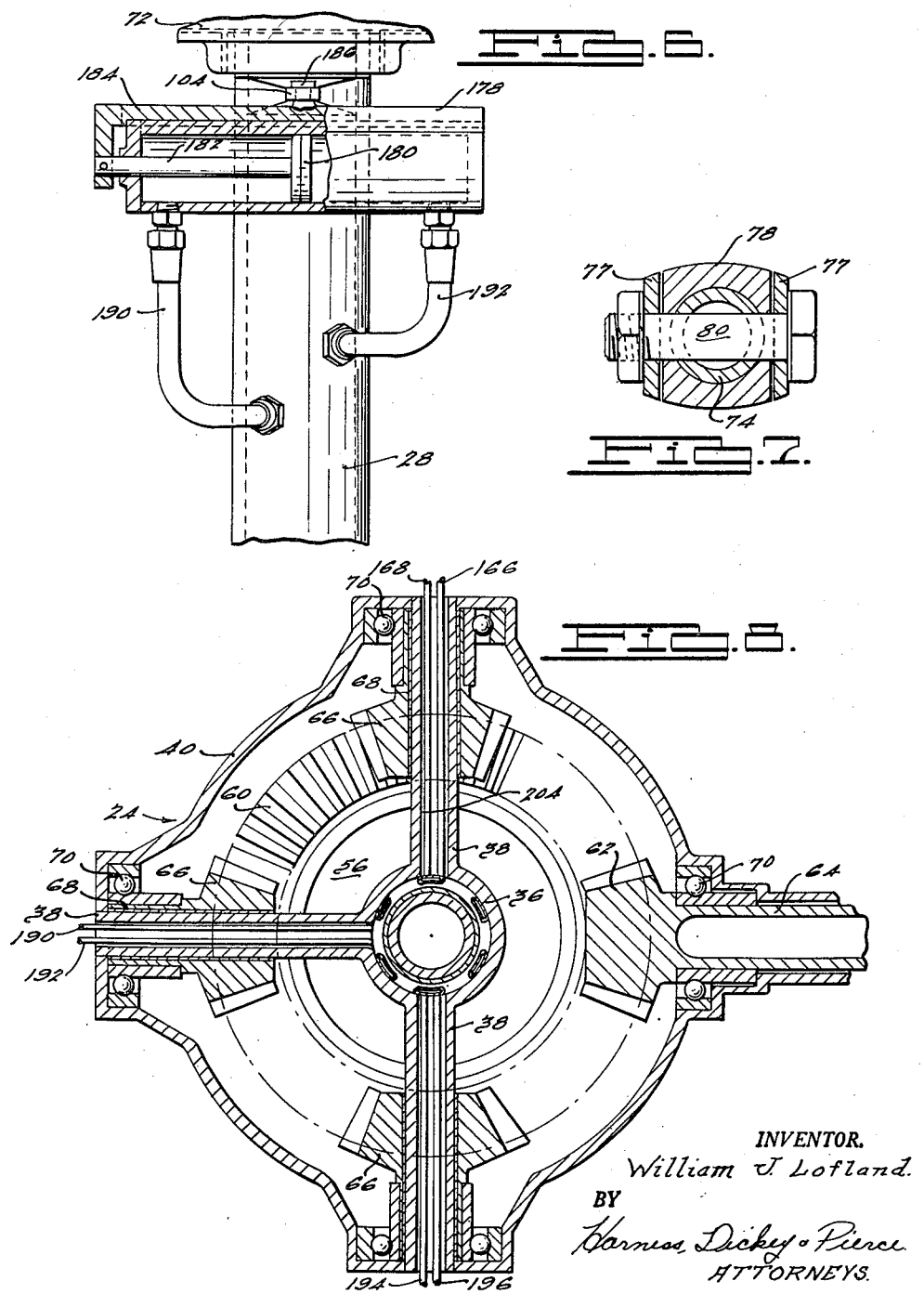

March 9, 1954    W. J. LOFLAND    2,671,517
HELICOPTER ROTOR-CONTROL STRUCTURE
Filed April 30, 1947    5 Sheets-Sheet 5
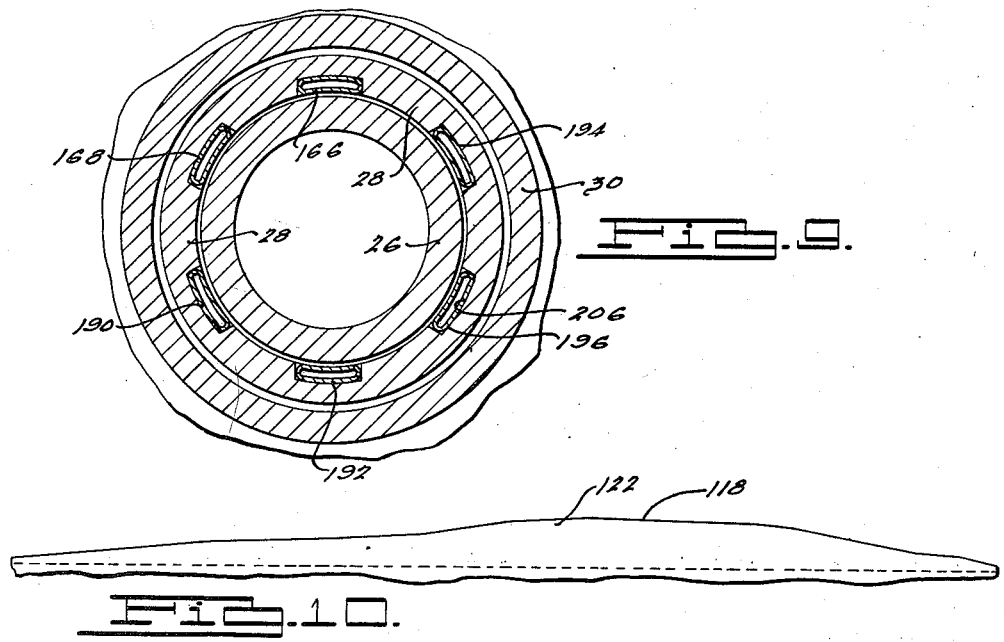
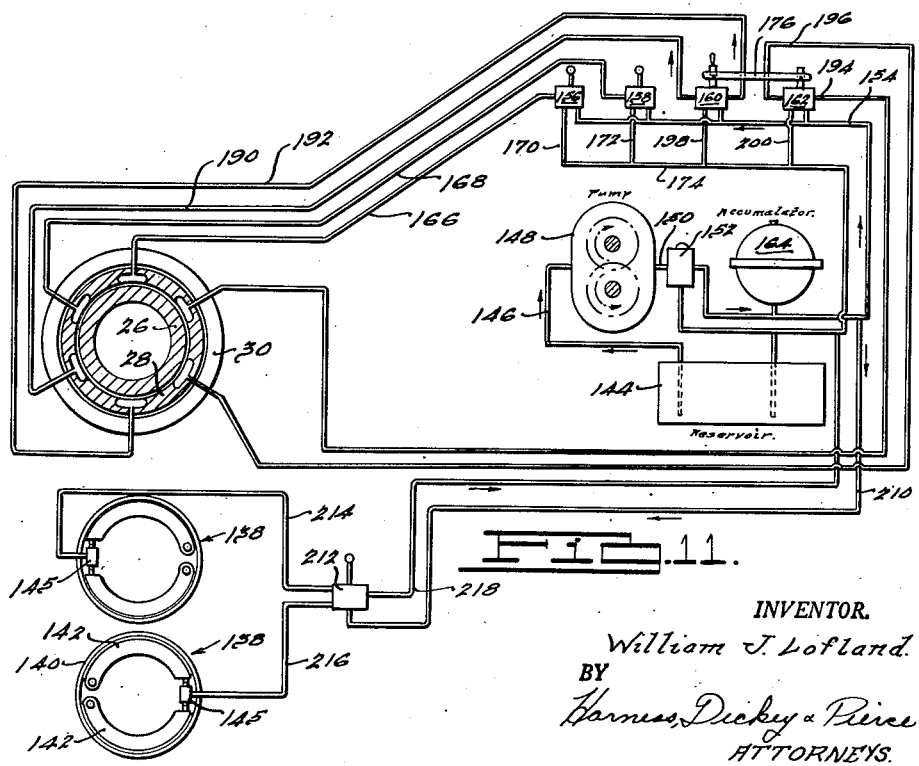
INVENTOR.
William J. Lofland
BY
Harness, Dickey & Pierce.
ATTORNEYS.

Patented Mar. 9, 1954

2,671,517

UNITED STATES PATENT OFFICE 2,671,517

HELICOPTER ROTOR-CONTROL STRUCTURE

William J. Lofland, Detroit, Mich.

Application April 30, 1947, Serial No. 745,066

11 Claims. (Cl. 170—135.24)

This invention relates to new and useful improvements in helicopters.

Wide use of the helicopter, as a general utility vehicle by private and commercial owners, has awaited a time when they can be flown safely with no greater degree of skill than is required to operate a private plane. At the present time most successful types of helicopters require a greater degree of skill and coordination of control than the most intricate military airplane. For example, all present helicopters within my knowledge have at least five controls as compared with the average small airplane which has only three; and these five controls must be synchronized and coordinated manually at all times. Moreover, the average helicopter is exceedingly sensitive to external conditions and it is necessary for the pilot continually to adjust one or the other of the controls to maintain proper flying stability. As a result, flying is unusually fatiguing, commercial flights can be made safely only in ideal flying weather, and experimental development is more or less limited to fair weather operation.

An important object of the present invention is to provide a helicopter wherein all operations necessary for flight can be accomplished by only three controls.

Another object of the invention is to provide a helicopter that can be flown with no greater degree of skill than is required to operate the average small airplane.

Still another object of the invention is to provide a helicopter wherein horizontal or lateral flight is accomplished by controlling the pitch of the rotor vanes instead of tilting the rotor mechanism in the conventional manner.

Yet another object of the invention is to provide a helicopter in which the pitch of the rotor vanes is controlled automatically so as to produce a high drag in one quadrant of rotation and a high lift efficiency in the other three quadrants.

Yet another object of the invention is to provide a helicopter wherein the high drag produced in one quadrant of rotation is utilized to propel the aircraft in horizontal flight.

A further object of the invention is to provide a helicopter having a high lift efficiency and which is capable of a lateral flight at relatively high speed.

A still further object of the invention is to provide a helicopter having novel means for controlling the pitch of the rotor vanes.

A yet further object of the invention is to provide a helicopter having a novel mounting for the drive shafts which operates the rotors.

A further object of the invention is to provide a helicopter having novel means for rotatably positioning the fuselage in flight.

Further objects and advantages of the invention will be apparent during the course of the following description.

In the drawings, forming a part of this specification and wherein like numerals are employed to designate like parts throughout the same:

Fig. 1 is a side elevational view of a helicopter embodying the invention, parts of the fuselage being broken away to illustrate more clearly a portion of the rotor drive mechanism;

Fig. 2 is an enlarged, fragmentary, transverse sectional view taken on the line 2—2 of Fig. 1;

Fig. 3 is a fragmentary, vertical, sectional view taken on the line 3—3 of Fig. 2;

Figs. 4 and 5 are vertical, sectional views taken on the line 4—4 of Fig. 2, Fig. 4 illustrating the upper portion of the rotor assembly and Fig. 5 illustrating the lower portion thereof;

Fig. 6 is a fragmentary, side elevational view looking in the direction of the arrows 6—6 in Fig. 4, and particularly illustrating the fluid motor which operates the pitch control mechanism, parts of the motor being broken away and shown in section for clearness of illustration;

Fig. 7 is a vertical sectional view taken on the line 7—7 of Fig. 4;

Fig. 8 is a fragmentary, transverse sectional view taken on the line 8—8 of Fig. 5;

Fig. 9 is a fragmentary, transverse sectional view taken on the line 9—9 of Fig. 5;

Fig. 10 is a developed view of a cam comprising a part of the pitch control mechanism, and Fig. 11 is a diagrammatic view of the hydraulic system which operates the pitch control mechanism and controls the rotative position of the fuselage in flight.

In the drawing, wherein for the purpose of illustration is shown a preferred embodiment of the invention, the numeral 20 designates a fuselage of more or less conventional design having landing wheels 22 and equipped with a pair of vertically spaced contra-rotating rotors 24.

The manner in which rotors 24 are mounted and supported for rotation is a feature of the invention, and for a detailed description thereof, attention is now directed to Figs. 4 and 5. The main supporting structure comprises three coaxial tubular shafts 26, 28, and 30, which shafts are arranged vertically in the fuselage 20 and extend through a bearing 32 in the roof of the fuselage. Suitable bushings 34 between shafts 26, 28, and 30 at the ends of the assembly support the inner and outer members 26 and 30 for independent rotation relative to the middle shaft 28. Thus the latter shaft 28 is stationary during operation of the machine and serves primarily as a support for the inner and outer shafts 26 and 30.

At the upper end of the drive shaft assembly, the drive shaft 26 extends from the stationary tubular supporting shaft 28 and the projecting portion thereof carries and rotatably drives the upper rotor 24. As shown in Figs. 1 and 4, the outer shaft 30 terminates a short distance above the fuselage 20 and carries the lower rotor 24. As suggested, means is provided for rotatably driving the two shafts 26 and 30 in opposite directions and, during rotation, both shafts are maintained and supported by the middle shaft 28.

At the lower end of the drive shaft assembly, the stationary tube 28 is fixed in a collar 36 which has three right angularly disposed, radially extending arms 38 and the whole is mounted in and fastened to a gear housing 40. The inner drive shaft 26 extends from the lower end of tubular shaft 28 and the projecting portion thereof is rotatably supported in the lower end of gear housing 40 by a bearing 42. In order to hold the rotor axially fixed with respect to the fuselage 20 the gear housing is suitably anchored to a platform 43 on the floor of the latter. In addition, shaft 26 also is fastened to the platform 43 by a ball and socket connection designated generally by the numeral 44 (Fig. 1). The ball portion 46 (Fig. 5) of connection 44 holds tube 26 axially fixed in the rotor assembly but permits the same to rotate freely in the supporting tube 28. The outer drive shaft 30 is rotatably supported in the upper portion of gear housing 40 by a suitable bearing 48. As clearly shown in the drawing, shaft 30 terminates in the upper portion of gear housing 40 and a hub member 50 secured thereto is confined by the housing and bearing 48 to prevent upward axial movement thereof.

Shafts 26 and 30 are driven simultaneously and synchronously in opposite directions by a suitable power source such as the internal combustion engine 52 through differential gearing in the gear housing 40. Engine 52 is here shown mounted on the platform 43 behind the gear housing 40. A hub member 56 is fixed on the projecting lower end of inner shaft 26 in opposed and vertically spaced relation with respect to the upper hub member 50, and annular beveled gears 58 and 60 carried by hub members 50 and 56 respectively mesh with a driving pinion 62 on the drive shaft 64 of engine 52. Idler gears 66 mounted for rotation on the radial arms 38 also mesh with annular gears 58 and 60 and hold the latter properly spaced and in free running engagement with the driving pinion 62. Each of the idler gears 66 preferably is provided with an internal sleeve bearing 68 and the hub portions thereof as well as the hub portion of driving pinion 62 are supported by external roller bearings 70 in the gear housing 40.

Rotors 24 are substantially identical in construction and operation but are mounted inversely on their respective driving shafts 26 and 30, as perhaps best shown in Fig. 4.

Each rotor 24 comprises a hub 72 and a plurality of radial vanes 74. Four vanes 74 arranged in diametrically opposed, right angularly disposed relations are here shown. Each vane 74 is fastened to the hub 72 by a relatively short stub shaft 76.

Proper operation in flight requires that the vanes 74 have limited, independent, vertical pivotal movement and, to this end, the root ends of the vanes are formed with bifurcations 77 which embrace hubs 78 on the stub shafts 76 and are fastened thereto by pivot pins 80 (Figs. 4 and 7). At its forward or axially outer end, each hub 78 is arcuately curved, as at 82, about a line coincident to or parallel with the axis of pivot 80 and the correspondingly shaped inner end of the vane 74 carried thereby seats snugly against and is supported by the end of the hub during oscillatory movement thereof about the pivot 80. In order to limit oscillatory movement of the vanes, the hubs 78 are formed with longitudinal extensions 84 which enter recesses 86 in the vanes 74. As clearly shown in Fig. 4, recesses 86 are substantially wider than the extensions 84 so that the extensions are free to move back and forth in the recess but are limited in such movement by the upper and lower walls of the recesses.

Each of the stub shafts 76 is journaled in a radial sleeve portion 88 of the hub 72 and is supported in such sleeve by suitable bushings 90. Packing 92 at the outer ends of sleeve portions 88 forms a fluid type seal with the stub shafts 76 and prevents lubricating oil in the hub from escaping along the shafts. At its inner end each stub shaft 76 is formed with a radial flange 94 which seats against an annular seat 96 in the hub 72 whereby such seats sustain radial thrust imposed by the vanes due to centrifugal force generated during operation of the rotor.

As a general proposition for a given speed, a single rotor vane of a helicopter produces approximately seven times as much lift as a fixed airfoil in level flight. However, while the lift-over-drag ratio remains constant on a fixed airfoil for a given speed the values vary on a conventional rotor vane from high lift efficiency in the first quadrant to a high drag in the last quadrant with little or no efficiency in the other two quadrants. The values begin to change again as lateral flight is started with the drag ratio increasing as the speed increases.

According to the present invention, the rotor vanes 74 are oscillated about their axes to effect a high drag in the first quadrant and a high lift efficiency in the other three quadrants, and the drag is utilized to produce an unbalanced condition which propels or moves the craft in horizontal flight. In order to produce this effect it is necessary to control the pitch of the individual rotor vanes continuously during rotation of the rotors. Moreover, since the drag effect increases as the pitch of the rotor vanes increases, it is desirable that means be provided for controlling the minimum and maximum pitch positions of the vanes throughout the cycle of operation in order that the operator may control the lateral or horizontal speed of the craft. Also, it is desirable that the operator be able to change the angular position of the high drag quadrant in order to steer the craft. By properly utilizing the above phenomena the operator can readily control the vertical and horizontal speed of the helicopter in flight and also determine its direction of travel with a minimum of control and a maximum of efficiency. The conventional method of steering which comprises tilting the rotor assembly is eliminated.

To this end, an annular, disk-shaped carrier plate 98 is mounted for rotatable or oscillatory adjustment in each rotor hub 72. In the upper rotor, carrier plate 98 is positioned adjacent the bottom of hub 72 and in the lower rotor the carrier plate is positioned at the top of the hub. In both instances, carrier plates 98 are carried by the intermediate supporting shaft 28 and are journaled for relatively frictionless turning movements by suitable bushings 100. Also, the carriers 98 have axially projecting portions 101 which extend along the shaft 28 exteriorly of the hubs 72, and the portions 101 are maintained in spaced, sealed relation with their respective hubs 72 by packing and sealing rings 102. Exteriorly of hubs 72 the axially projecting portions 101 are provided with radial arms 104 which are operated hydraulically in a manner hereinafter described in detail to rotatably adjust the carriers 98 in the hubs 72.

Within hubs 72, the carriers 98 are formed with a pair of concentric annular grooves 106 and 108 which open into the hub and receive annular cam-pistons 110 and 112, respectively. Each cam-piston preferably is provided at opposite sides thereof with suitable rings 114 which effect a fluid tight seal with the side walls of grooves 106 and 108 and both cam-pistons are suitably held against independent rotation in the carriers. According to the present invention, cam-pistons 110 and 112 rotate with the carriers 98 and the outer annular faces thereof are formed with annular cam tracks 116 and 118 respectively which control the pitch position of the rotor vanes 74. Moreover, the cam-pistons 110 and 112 can be selectively projected or retracted in grooves 106 and 108 by suitable hydraulic means hereinafter described in detail to control the maximum and minimum pitch positions of the rotor vanes.

Each of the stub shafts 76 is provided at the inner end thereof with an eccentrically positioned, axial extension 120, and each extension is provided at the side thereof remote from the center of its respective shaft with a pair of rollers 122 and 124. These rollers 122 and 124 are set into transverse slots in extensions 120 and they project radially beyond the extensions to engage cam tracks 116 and 118, respectively (Fig. 4). Rollers 122 and 124 are maintained in pressed engagement with cam tracks 116 and 118 by coil springs 126 confined within hubs 72 opposite the rollers. As best shown in Fig. 3, the inner ends of springs 126 fit over and are retained by studs 128 formed integrally on extensions 120 and the outer ends thereof are similarly retained by studs 130 on plugs 132 which are threaded into the hubs 72. The opposed studs 128 and 130 position springs 126 to bear against extensions 120 throughout the entire range of oscillatory adjustment provided for the rotor vanes.

The cam tracks 116 of both inner cam-pistons 110 are essentially flat, and the cam tracks 118 of both outer cam-pistons 112 are of undulating or irregular character. Moreover, both of the outer cam-pistons 112 are formed with identical cam track profiles; and the two cam-pistons are similarly positioned in their respective grooves 108 so that, when the two carrier plates 98 and the cam-pistons carried thereby are identically positioned, the two sets of rotor vanes 74 are identically positioned at corresponding points in their rotation.

Fig. 10 shows a developed view of an outer cam-piston 112 and illustrates the manner in which the cam track profile 118 is formed to vary the pitch of the rotor vanes continuously during rotation of the rotor.

As suggested, hydraulic means is provided for simultaneously advancing the two inner cam-pistons 110 in grooves 106 and for simultaneously advancing the two outer cam-pistons 112 in grooves 108, and as the cam-pistons are projected they act through rollers 122 or 124 (depending on which set of cam-pistons is operated) and the eccentric extensions 120 to rotatably adjust or oscillate the stub shafts 76 and the rotor vanes 74 carried thereby. In every instance, advancement of the cam-pistons 110 and 112 acts to increase the pitch of the rotor vanes, and the vanes are held in a selected adjusted position as long as hydraulic liquid is maintained in the grooves behind the cam-pistons. When the hydraulic system is operated to release the liquid behind pistons 110 or 112, air pressure tending to reduce the pitch or feather the rotor vanes reacts through the vanes and their appurtenances to retract the pistons 110 and 112.

From the foregoing, it will be readily apparent that the pitch of the rotor vanes 74 is varied continuously during rotation of the rotors by travel of rollers 124 on the outer cam tracks 118 and that these cam-pistons can be selectively positioned in grooves 108 to control the maximum and minimum pitch positions of the vanes during such rotation. In addition, the inner cam-pistons 110 can be selectively positioned in grooves 106 to simultaneously affect the pitch angle of all rotor vanes 74. Preferably, the inner cam tracks 116 are flush with the lowest portions of the outer cam tracks 118 when both pistons 110 and 112 are fully retracted so that, in this position of the cam-pistons, the outer cam tracks 118, in effect, control the pitch of the rotor vanes 74 throughout the entire revolution thereof. If the inner pistons 110 only are advanced, the inner cam tracks 116 control the pitch of the rotor vanes 74 during a portion of the revolution and the portions of cam tracks 118 which project beyond the inner cam tracks 116 control the pitch of the rotor vanes during the remaining angular movement of rotation. In this manner the change of pitch brought about during each revolution of the rotor vanes can be controlled by selectively positioning the inner and outer cam-pistons 110 and 112 with respect to each other.

In order to control the angular position of fuselage 20 in flight, a brake assembly 138 is provided for each of the rotor drive shafts 26 and 30. Each brake assembly comprises a brake drum 140 which centrally receives and is fixed to its respective drive shaft and brake shoes 142 which are associated with the brake drum 140 in the conventional manner and are mounted on suitable supporting arms 144 on the gear housing 40 (Fig. 5). The brake shoes 142 in each brake assembly conveniently may be actuated hydraulically by fluid motors 145 in the conventional manner.

Thus, brake shoes 142 are stationary in the fuselage 20 and brake drums 140 rotate continuously with the drive shafts 26 and 30. By selectively engaging brake shoes 142 with one or the other of the brake drums 140, the fuselage 20 can be made to move angularly in a horizontal plane about the rotor assembly. In this connection, it will be readily apparent that the two rotors moving in opposite synchronized rotation neutralize the torque of each rotor tending to rotate the fuselage in flight.

Attention is now directed to Fig. 11 which shows diagrammatically a hydraulic system for controlling the pitch of the rotor vanes 74 in flight and for operating the brake assemblies 138 to selectively angularly position the fuselage 20. Hydraulic liquid from a reservoir 144 passes through a pipe 146 to the suction side of a pump 148 and is discharged under pressure from the latter through a pipe 150, relief valve 152 and a pipe 154 to four control valves 156, 158, 160 and 162. In order to maintain an even flow and uniform pressure in the liquid supply line, an air or gas accumulator 164 is connected in the pipe 154 between relief valve 152 and control valves 156—162.

Valves 156 and 158 control the outer and inner cam-pistons 112 and 110 respectively and are provided with separate discharge pipes 166 and 168 which communicate with grooves 108 and 106 behind the cam-pistons. Valves 156 and 158 also are provided with separate outlet pipes 170 and 172 which connect with a pipe 174 leading back to the reservoir 144. Both of the control valves 156 and 158 are manually operable and preferably are mounted on the instrument panel of the dashboard in a position where they are readily accessible.

By positioning valves 156 and 158 to establish communication between inlet pipe 154 and outlet pipes 166 and 168, the pistons 112 and 110 can be selectively projected to increase the pitch of the rotor vanes in the manner hereinabove described. By positioning the valves 156 and 158 in neutral position, communication between the inlet pipe 154 and outlet pipes 166 and 168 is cut off and the pistons 112 and 110 are held in the selective adjusted positions. In order to retract pistons 112 and 110, control valves 156 and 158 are manipulated to establish communication between pipes 166 and 168 and pipes 170 and 172 so that liquid can drain from the grooves 108 and 106 back to the reservoir 144.

In this connection, it will be noted that a single pipe from each of the control valves 156 and 158 to its respective groove 108 and 106 is sufficient, since hydraulic pressure is necessary only to project the cam-pistons 110 and 112. As hereinabove suggested, the cam-pistons are retracted by torque from the rotor vanes 74 and merely by positioning the control valves to establish communication between the grooves 108 and 106 and reservoir 144. Consequently, a single supply line to the grooves is sufficient in this instance.

Control valves 160 and 162 control rotation of carrier plates 98 and they are connected by a linkage 176 for simultaneous operation. In this manner, a single manual control operates both valves 160 and 162 and manipulation of the handle effects simultaneous rotation of the carrier plates in both the upper and lower rotors 24. Valves 160 and 162 also preferably are mounted on the instrument panel of the dashboard and in proximity to valves 156 and 158.

Each carrier plate 98 is provided with a fluid motor which comprises a cylinder 178 fixed to the stationary supporting tube 28 by a suitable bracket 179, a piston 180 mounted for reciprocation in the cylinder, a piston rod 182 extending from the piston axially through one end of the cylinder, and a slide 184 which is fastened to the rod 182 and is mounted for translatory sliding movement on the cylinder. Each slide 184 carries an upstanding pin 186 which extends through an elongated slot 188 in its respective actuator arm 104. Piston 180 is moved back and forth in cylinder 178 by establishing communication between the source of hydraulic pressure and the cylinder at one side or the other of the piston.

Manifestly, when piston 180 is moved in one direction or the other the carrier plate 98 associated therewith is rotatably adjusted in the rotor hub 72 to change the angular position of the high drag quadrant which determines the direction of horizontal flight for the aircraft.

Valve 160 is provided with separate discharge lines 190 and 192, which connect at opposite ends of the cylinder 178 associated with the upper rotor 24, and valve 162 is provided with separate discharge pipes 194 and 196 which connect at opposite ends of the cylinder 178 associated with the lower of rotor 24. In addition, valves 160 and 162 are provided with discharge pipes 198 and 200 respectively, which connect with the liquid return pipe 174 and thus back to reservoir 144.

In one position of the manual control for valves 160 and 162, hydraulic fluid under pressure passes through pipes 190 and 194 to move pistons 180 simultaneously to adjust the two carrier plates 98. In another position of the manual control, communication is cut off between inlet pipe 154 and outlet pipes 190 and 194 and the carrier plates 98 are held in the selected adjusted position. In still another position of the manual control, fluid under pressure passes through pipes 192 and 196 to move pistons 180 in the opposite direction and to change the rotative position of carrier plates 98 in a reverse direction.

The mounting here shown for the rotors 24 provides a simple yet highly efficient means for transferring the hydraulic liquid from the reservoir 144 and pump 148, which preferably are mounted in the rear of the fuselage 20, to the various pistons and cylinders hereinabove described, and in this connection it will be observed that six hydraulic lines lead to terminals in or adjacent to the rotors 24. According to the present invention, these hydraulic lines 166, 168, 190, 192, 194 and 196 extend radially inwardly to the stationary supporting tube 28 through axial passages 204 in the radial arms 38 which support the lower end of the rotor assembly in the gear housing 40 (Fig. 8). At the inner ends of passages 204 the hydraulic tubes are distributed circumferentially within the collar 36 to substantially equispaced vertical grooves 206 provided in the inner surface of shaft 28. Grooves 206 are relatively shallow and those portions of the hydraulic pipes in grooves 206 are flattened, as shown in Fig. 9, so as not to appreciably weaken the shaft 28 or to interfere with rotation of drive shaft 26.

At the upper end of support 28 and intermediate the two rotors 24, two tubes 166a lead from the vertical tube 166 to respective carrier plates 98 and hydraulic liquid in tube 166 passes simultaneously through tubes 166a and passages 166b in the carrier plates 98 to the outer grooves or cylinders 108 (Fig. 4). Similarly, two tubes 168a extend from tube 168 to respective carrier plates 98, and hydraulic liquid in tube 168 passes simultaneously through the two tubes 168a to passages 168b which lead to the inner grooves or cylinders 106. Two short sections of tubing 190a and 192a connect tubes 190 and 192 respectively to opposite ends of the hydraulic cylinder 178 which serves the upper rotor 24, and two short lengths of tubing 194a and 196a connect tubes 194 and 196 respectively to opposite ends of the cylinder 178 which serves the lower rotor 24.

By reason of the above construction and arrangement of parts, the pilot can easily control the pitch and direction of flight of the aircraft by only three manual controls. The entire control apparatus is simple in construction and light in weight, and the parts are arranged to occupy a minimum of space.

That portion of the hydraulic system which serves the two hydraulic brakes 138 comprises a branch pipe 210 (Fig. 11) which extends from the supply line 154 to a suitable manually operable control valve 212. This control valve 212 directs fluid to one or the other of the brake assemblies through pipes 214 or 216 and fluid from the brake assembly is returned to the reservoir 144 through pipes 218 and 170.

As suggested, the frictional engagement between the brake bands 140 and brake shoes 142 effects rotation of the fuselage 20 and the direction of rotation depends upon which brake assembly is operated. In this connection, it will be readily apparent that the speed at which the fuselage 20 is turned will depend upon the amount or degree of frictional engagement between the brake shoes and the brake bands, and this friction can be readily controlled by proper manipulation of the valve 212. The brake control valve may be mounted at any convenient place in the fuselage, but it preferably is mounted on the instrument panel alongside valves 156–162.

It is to be understood that the form of the invention herewith shown and described is taken as a preferred example of the same, and that various changes in the size, shape and arrangements of parts may be resorted to without departing from the spirit of the invention or the scope of the appended claims.

Having thus described the invention, I claim:

1. In a helicopter, a fixed, tubular support; a rotor having a hollow hub portion and a plurality of rotor vanes carried by and extending radially from said hub portion, said vanes being rotatably adjustable about their axes; a rotatable drive shaft journaled for rotation in said support and connected to the hub portion of said rotor; a cam plate mounted in said hub portion and on said support for adjustment angularly around said support, said cam plate having concentric annular grooves opening into the propeller hub; annular cam pistons in said grooves and having cam surfaces; eccentric shank portions on the inner ends of said rotor vanes; rollers journaled on said shank portions and engaging respective cam surfaces during rotation of the rotor; means for selectively projecting or retracting said cam pistons simultaneously or individually; and means for rotatably adjusting the cam plate on said support.

2. The combination as set forth in claim 1 wherein the means for actuating the cam pistons and said cam plate include fluid motors, and wherein hydraulic liquid is supplied to said fluid motors through tubular conduits imbedded in and extending longitudinally through the said tubular support and connected at one end thereof to said fluid motors.

3. In a helicopter, a fixed vertical support; separate drive shafts journaled in and on said support; means for rotating said drive shafts in opposite directions; rotors carried by said drive shafts, each rotor having a hollow hub and a plurality of rotor vanes journaled in and extending radially from said hub; rotatably adjustable cam plates in said propeller hubs; each cam plate having a pair of concentric annular grooves which open into the propeller hub with which it is associated; concentric annular pistons in said annular grooves; eccentric shanks on the root ends of said vanes arranged above said pistons; rollers carried by said shanks arranged to travel along said pistons during rotation of the rotors, the portions of the pistons engaged by the rollers defining cams which control the pitch of said vanes; fluid pressure means communicating with the grooves behind said pistons for selectively projecting and retracting the latter; fluid motors for rotatably adjusting said cam plates; and a hydraulic system for supplying fluid under pressure to said grooves and said fluid motors, said system including three controls one of which controls the flow of fluid to the outer groove of each pair, another of which controls the flow of fluid to the inner groove of each pair and the other of which controls the flow of fluid to said fluid motors.

4. In a helicopter, a fixed, tubular support; a rotor having a hollow hub portion and a plurality of rotatably adjustable rotor vanes carried by and extending radially from said hub portion; a rotatable drive shaft mounted for rotation in said support and having a driving connection with the hub portion of said rotor; a cam plate disposed within said hub portion and mounted for rotatable adjustment on said support, said cam plate having concentric annular grooves opening into the propeller hub; annular pistons in said grooves having cam surfaces; hydraulic means connected to said annular pistons for simultaneously or individually projecting or retracting said annular pistons; means connected to the rotor vanes and actuated by said pistons for rotating the rotor vanes about their axes; and means for rotatably adjusting the cam plate on said support, said means for actuating the pistons and said cam plate being hydraulically controlled and hydraulic liquid being supplied to said means through tubular conduits embedded in and extending longitudinally through said tubular support.

5. In a helicopter, a fixed, tubular support; a rotor having a hollow hub portion and a plurality of rotatably adjustable rotor vanes carried by and extending radially from said hub portion; a rotatable drive shaft journaled for rotation in said support and connected to the hub portion of said rotor; a cam plate within said hub portion mounted for rotatable adjustment on said support, said cam plate having one annular groove opening into the peripheral hub; an annular piston in said groove and having a cam surface; eccentric shank portions on the inner ends of said rotor vanes; rollers on said shank portions engaging said cam surface during rotation of the rotor; means for selectively projecting or retracting said annular piston; and means for rotatably adjusting the cam plate on said support, the means for actuating the cam piston and said cam plate being hydraulically controlled and hydraulic liquid being supplied thereto through tubular conduits embedded in and extending longitudinally through said tubular support.

6. In a helicopter, a fixed, tubular support; a rotor having a hollow hub portion and a plurality of rotor vanes carried by and extending radially from said hub portion, said vanes being rotatably adjustable about their axes; a rotatable drive shaft associated with said support and connected to the hub portion of said rotor; a cam plate within said hub portion mounted for rotatable adjustment on said support, said cam plate having an annular groove opening into the hub; an annular piston in said groove having a cam surface; means including a cam follower connected to said rotor vanes and mounted to ride on said cam surface actuated by said piston for rotating the rotor vanes about their axes; and means for rotatably adjusting the cam plate on said support, the means for actuating said cam piston and said cam plate being hydraulically controlled and hydraulic liquid being supplied thereto through tubular conduits embedded in and extending longitudinally through the tubular support.

7. In a helicopter, a fixed, tubular support; a rotor having a hollow hub portion and a plurality of rotatably adjustable rotor vanes carried by and extending radially from said hub portion, a rotatable drive shaft connected to the hub portion of said rotor; a cam plate within said hub portion having an annular groove opening into said hub portion; an annular piston in said groove having a cam surface; means for selectively advancing or retracting said annular piston; and means connected to said rotor vanes and actuated by said piston for rotating the rotor vanes about their axes, the means for actuating said cam piston being hydraulically controlled and hydraulic liquid being supplied thereto through tubular conduits embedded in and extending longitudinally through said tubular support.

8. In a helicopter, upper and lower rotors each having a plurality of rotatably adjustable vanes and each rotor being provided with hollow hub portions; a fixed, stationary, vertical, tubular support having a plurality of fluid conduits extending longitudinally therealong; an inner drive shaft journaled for rotation in said support, the upper terminal portion of said drive shaft projecting from the support and carrying said upper rotor; an outer tubular drive shaft journaled for rotation on said support and carrying said lower rotor; plate members carried by said support and disposed in respective hub portions, each of said plate members having at least one annular groove opening into the hub with which it is associated; annular pistons in said grooves; means connected to said rotor vanes and actuated by said pistons for rotating the rotor vanes about their axes; means establishing communication between said conduits and said annular grooves behind said pistons; means for supplying hydraulic liquid under pressure to said conduits; and means for rotating said inner and outer drive shafts in opposite directions.

9. In a helicopter, upper and lower rotors each having a plurality of rotatably adjustable vanes and each rotor being provided with hollow hub portions; a fixed, stationary, vertical, tubular support having a plurality of fluid conduits extending longitudinally therealong; an inner drive shaft journaled for rotation in said support, the upper terminal portion of said drive shaft projecting from the support and connected to said upper rotor for mutual rotation therewith; an outer tubular drive shaft journaled for rotation on said support and connected to said lower rotor for mutual rotation therewith; a disk-shaped plate for each of said rotors, said plates being mounted for rotative movement on said support and each plate being disposed in the hub portion of its respective rotor, each of said plates having at least one annular groove in one side thereof and each groove opening into the hub with which it is associated; annular pistons in said grooves; means connected to said rotor vanes and actuated by said pistons for controlling the pitch of the rotor vanes; means for conducting hydraulic fluid from said conduits to said grooves behind said pistons; and hydraulically operated fluid motors supplied by said conduits and mechanically connected to said plates for selectively rotatably adjusting said plates on said support.

10. In a helicopter, upper and lower rotors each having a plurality of rotatably adjustable vanes and each rotor being provided with hollow hub portions; a fixed, stationary, vertical, tubular support having a plurality of fluid conduits extending longitudinally therealong; an inner drive shaft journaled for rotation in said support, the upper terminal portion of said drive shaft projecting from the support and connected to said upper rotor for mutual rotation therewith; an outer tubular drive shaft journaled for rotation on said support and connected to said lower rotor for mutual rotation therewith; a disk-shaped plate for each of said rotors, said plates being mounted for rotative movement on said support and each plate being disposed in the hub portion of its respective rotor, each of said plates having at least one annular groove in one side thereof and each groove opening into the hub with which it is associated; annular pistons in said grooves; means connected to said rotor vanes and actuated by said pistons for controlling the pitch of the rotor vanes; means for conducting hydraulic fluid from certain of said conduits to said grooves behind said pistons; and hydraulic means supplied by other of said conduits for rotatably adjusting said plates on said support.

11. In a helicopter, upper and lower rotors each having a plurality of rotatably adjustable vanes and each rotor being provided with hollow hub portions; a fixed, stationary, vertical, tubular support having a plurality of fluid conduits extending longitudinally therealong; an inner drive shaft journaled for rotation in said support, the upper terminal portion of said drive shaft projecting from the support and connected to said upper rotor for mutual rotation therewith; an outer tubular drive shaft journaled for rotation on said support and connected to said lower rotor for mutual rotation therewith; a disk-shaped plate for each of said rotors, said plates being mounted for rotative movement on said support and each plate being disposed in the hub portion of its respective rotor, each of said plates having at least one annular groove in one side thereof and each groove opening into the hub with which it is associated; annular pistons in said grooves; means connected to said rotor vanes and actuated by said pistons for controlling the pitch of the rotor vanes; means for conducting hydraulic fluid from certain of said conduits to said grooves behind said pistons; arms connected to and extending radially from said plates, fluid motors connected to the support under and arranged transversely to said arms, said rotors being connected to respective arms and operative to adjust the plates angularly about the support; and means connecting other of said conduits to the fluid motors for supplying hydraulic liquid necessary to operate said motors.

WILLIAM J. LOFLAND.

(References on following page)

References Cited in the file of this patent

UNITED STATES PATENTS

| Number | Name | Date |
|---|---|---|
| 1,957,813 | Wilford | May 8, 1934 |
| 2,037,745 | Vaughn | Apr. 21, 1936 |
| 2,256,918 | Young | Sept. 23, 1941 |
| 2,377,386 | Stalker | June 5, 1945 |
| 2,389,798 | Main | Nov. 25, 1945 |
| 2,410,533 | Thomson | Nov. 5, 1946 |
| 2,425,261 | Murphy | Aug. 5, 1947 |
| 2,430,947 | Platt et al. | Nov. 18, 1947 |
| 2,435,080 | Hoover | Jan. 27, 1948 |
| 2,456,485 | Bendix | Dec. 14, 1948 |
| 2,456,510 | Hurt | Dec. 14, 1948 |
| 2,505,759 | Faulkner | May 2, 1950 |

FOREIGN PATENTS

| Number | Country | Date |
|---|---|---|
| 10,467 | Great Britain | 1909 |
| 610,434 | Germany | Mar. 12, 1935 |